Jan. 30, 1945.    A. GAUDENZI    2,368,535
DEMOUNTABLE HIGH-POWER TRIODE
Filed July 20, 1942
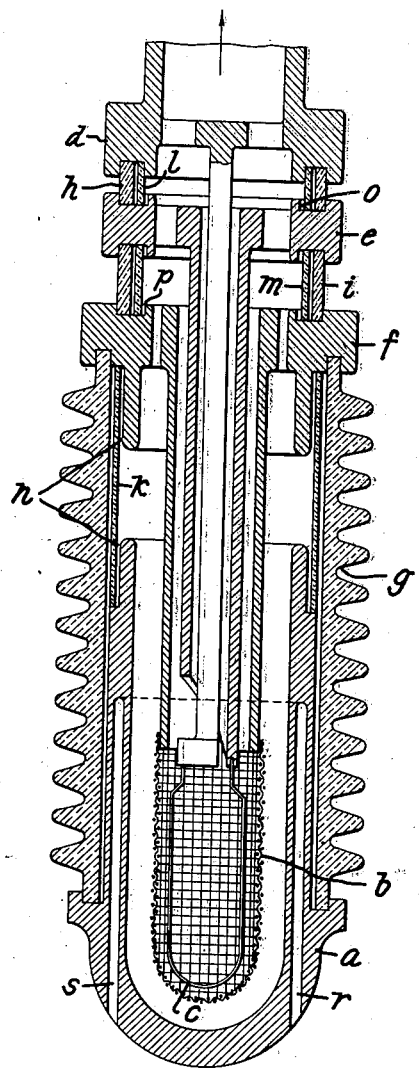
Inventor:
Arthur Gaudenzi,
By Pierce & Scheffler,
Attorneys Patented Jan. 30, 1945

2,368,535

UNITED STATES PATENT OFFICE 2,368,535

DEMOUNTABLE HIGH-POWER TRIODE

Arthur Gaudenzi, Wettingen, Switzerland, assignor to Aktiengesellschaft Brown, Boveri & Cie., Baden, Switzerland Application July 20, 1942, Serial No. 451,603
In Switzerland August 6, 1941

9 Claims. (Cl. 250—27.5)

It is known that high-vacuum hot cathode tubes provided with control grids can be used as converters for the transmission of power over long distances. Converters of this kind, however, only operate economically when the transmission voltage is very high, that is to say several hundred kilo volts, because the voltage drop in the tube amounts to between 500 and 1000 volts when the current exceeds 100 amperes.

The advantage of these high-vacuum tubes, which can be used both for alternating current-direct current conversion and vice versa, is the great accuracy with which they can be controlled because with a vacuum of $10^{-5}$ millimeters mercury column and less there is practically no ionisation. These converters are built as standard high-vacuum triodes with electron control. For the conversion of very large powers the tubes must, however, be of a very robust construction and this is possible if they are made of metal, whilst thick glass, porcelain or similar material is used for the insulating parts, the entire construction being made demountable. Such a demountable construction necessitates that the tube be continuously connected to a high-vacuum pump so that the aforementioned vacuum of at least $10^{-5}$ mm. Hg which is necessary for reliable control and internal insulation strength can be obtained.

With high power tubes of the kind described it can, however, happen that disturbances may occur in the converter despite the very low pressure inside the tube. Short circuits can occur and arc discharges develop which cannot be controlled by the grid control. These arcs are of high power and heat up the internal elements of the tube until the power is disconnected by a high-power circuit breaker. It is furthermore known that these arcs pass over the internal metal parts of the tube, but this does not greatly endanger the converter because the tubes have thick walls, are artificially cooled and have a high thermal resistance. The insulating elements of the tube, however, react differently when they come in contact with such a high-power arc and they may easily crack or even be completely destroyed by the arc.

The object of the present invention is thus to eliminate these causes of breakdowns in demountable high power triodes which are continuously connected to a high vacuum pump. According to the invention this is achieved by protecting the inside of those insulating parts of the tube which come into contact with arc discharges by means of protective shields made of insulating material having a low coefficient of heat expansion (for instance $1 \times 10^{-6}$). These shields serve to protect the insulating elements of the tube from the detrimental effects of the arc.

A constructional example of the invention is illustrated diagrammatically in the accompanying drawing which shows a demountable high power triode in longitudinal section.

In the figure $a$ indicates the air or liquid cooled anode of copper or iron, $b$ the control grid of tungsten or molybdenum and $c$ the hot cathode of tungsten. The heating current for the hot cathode $c$ passes through flanges $d$ and $e$ which are also cooled. The current supply to the control grid $b$ flows through flange $f$. Since the tube is demountable it must be continuously connected to a high vacuum pump which can be located either at the anode or cathode end of the tube. In the constructional example under consideration the pump (not shown in drawing) is connected to the cathode end of the tube. Between anode $a$ and grid flange $f$ is the main insulator $g$ and in order to keep the tube as short as possible the greater part of the anode is located within the insulator $g$. This insulator $g$ should be dimensioned for the blocking voltage, which for instance in a six-phase installation amounts to about twice the direct voltage. Between flanges $d$ and $e$ and flanges $e$ and $f$ insulators $h$ and $i$ respectively are provided, which are connected to the associated flange parts by means of demountable joints and can thus be readily disconnected when the tube is dismantled for the purpose of renewing any of the parts. Cylindrical shields $k$, $l$ and $m$ of high heat resisting insulating material are arranged on the inside of insulators $g$, $h$ and $i$ and these shields serve to protect the insulators from the effects of the arc. Shields $k$, $l$ and $m$ can be made of quartz, ceramic material, glass and the like. Quartz has for instance a very low coefficient of heat expansion ($1 \times 10^{-6}$) and a fairly high melting point (1850° C.) and is therefore very insensitive to the effects of heat. Materials made from silicon carbide, such as "Carborundum," "Sipa" or "Sintercorund," which offer a high resistance to heat can also be used for the manufacture of these protective shields.

The protective shields $k$, $l$ and $m$ can be so arranged that annular gaps $n$, $o$ and $p$ respectively are formed between them and the metal parts of the associated flanges. These annular gaps serve to prevent the entire inner surface of the protective shields $k$, $l$ and $m$ from being covered with dust. Furthermore the location of these shields is such that they are not subjected to direct radiation from the hot cathode.

In the constructional example illustrated the anode $a$ is artifically cooled by means of a liquid, for instance oil or water. The cooling liquid flows to the anode through the passage $r$ and leaves by means of the passage $s$. Instead of a liquid it is of course also possible to use air as a cooling medium.

I claim:

1. In a demountable high power converter of the type having a continuous connection to a high vacuum pump, the combination with a tubular envelope comprising alternately arranged metal and ceramic material members, one metal member being the anode element of the triode, and grid and cathode elements within said anode element and connected respectively to other metal members, of means protecting the inner walls of said ceramic material members from arc discharges inadvertently arising within said envelope, said protecting means comprising shields of insulating material having a low coefficient of heat expansion of the order of $1 \times 10^{-6}$.

2. In a demountable high power converter, the invention as recited in claim 1, wherein said ceramic material members have cylindrical inner walls, and said shields are cylindrical and spaced inwardly from said ceramic material members by annular passages.

3. In a demountable high power converter, the invention as recited in claim 1, wherein said ceramic material members have cylindrical inner walls, said shields are cylindrical and spaced inwardly from said ceramic material members by annular passages, and the metal members include portions telescoped within the ends of the adjacent cylindrical shields and spaced therefrom by annular passages.

4. In a demountable high power converter, the invention as recited in claim 1, wherein said cathode element is a directly heated filament connected between two of said metal members, and said elements include portions positioned between said cathode element and said shields, whereby said shields are not subject to direct radiations from said cathode element.

5. In a demountable high power converter, the invention as recited in claim 1, wherein said shields are of quartz.

6. In a demountable high power converter, the invention as recited in claim 1, wherein said shields are of silicon carbide.

7. In a demountable high power electron tube, an anode having a cylindrical portion and a closed end portion that constitutes a part of the envelope of the tube, a main cylindrical insulator telescoped over and projecting beyond the cylindrical portion of said anode to constitute a part of the tube envelope, metal flange members and cylindrical insulators assembled in alternation upon the projecting end of said main cylindrical insulator and constituting parts of the tube envelope, grid and cathode elements located within the cylindrical portion of said anode and connected to the several flange members, and means for connecting the tube envelope to a vacuum pump.

8. In a demountable high power electron tube, the invention as recited in claim 7, in combination with cylindrical shields of insulating material between the several cylindrical insulators and the interior of said tube envelope to protect said cylindrical insulators from arc discharges, said shields having a lower temperature coefficient of expansion than said insulators.

9. In a demountable high power electron tube, the invention as recited in claim 7, in combination with cylindrical shields of insulating material between the several cylindrical insulators and the interior of said tube envelope to protect said cylindrical insulators from arc discharges, said shields having a lower temperature coefficient of expansion than said insulators, said anode and metal flanges having portions telescoped within and spaced radially from the associated shields by annular passages.

ARTHUR GAUDENZI.